United States Patent [19]
Hodges

[11] Patent Number: 5,958,481
[45] Date of Patent: Sep. 28, 1999

[54] METHOD OF MAKING NOVELTY ICE CUBES

[76] Inventor: William S. Hodges, 444 Saratoga Ave., Apt. 41G, Santa Clara, Calif. 95050

[21] Appl. No.: 09/039,931

[22] Filed: Mar. 16, 1998

[51] Int. Cl.$^6$ .................................. A23G 9/00; A23P 1/00
[52] U.S. Cl. ..................................... 426/100; 62/1; 62/75; 426/66; 426/249; 426/515; 426/524
[58] Field of Search .............................. 426/66, 100, 249, 426/515, 524; 62/1, 72, 74, 75, 340

[56] References Cited

U.S. PATENT DOCUMENTS

| | | | |
|---|---|---|---|
| 2,334,941 | 11/1943 | Linden | 426/66 |
| 3,962,886 | 6/1976 | Hammar | 62/340 |
| 4,021,583 | 5/1977 | Arden | 426/134 |
| 4,986,080 | 1/1991 | Grigoli et al. | 62/75 |
| 4,990,169 | 2/1991 | Broadbent | 62/72 |
| 5,035,911 | 7/1991 | Somura | 426/515 |
| 5,077,075 | 12/1991 | Wade | 426/564 |
| 5,157,929 | 10/1992 | Hotaling | 62/66 |
| 5,374,436 | 12/1994 | White et al. | 426/524 |
| 5,394,705 | 3/1995 | Torii et al. | 62/74 |
| 5,447,036 | 9/1995 | Heinrich | 62/75 |
| 5,603,219 | 2/1997 | Kolb | 62/74 |
| 5,618,463 | 4/1997 | Rindler et al. | 249/92 |

*Primary Examiner*—George C. Yeung
*Attorney, Agent, or Firm*—Richard L. Miller, P.E

[57] ABSTRACT

A method of making novelty ice cubes that change color which includes the steps of: pouring water into a first ice cube tray to form a poured first solution; freezing the poured first solution to form a frozen first solution; removing the frozen first solution from the first ice cube tray to form clear ice cubes; adding a food dye to citric acid to form a second solution; mixing the second solution to form a mixed second solution; pouring an amount of the mixed second solution into a second ice cube tray to form a poured layer; freezing the poured layer to form a frozen thin layer; wetting the frozen layer to form a wetted thin layer; placing a clear ice cube of the clear ice cubes onto each wetted layer to form a combination; pouring an additional amount of the mixed second solution onto the combination, until a layer of the mixed second solution covers the exposed portion of the clear ice cubes to form together with the frozen layer a layer encasement that completely encases the clear ice cubes and forms with the clear ice cubes an encased combination; freezing the encased combination to from a frozen combination; removing the frozen combination from the second ice cube tray to form colored and flavored ice cubes; putting the colored and flavored ice cubes into a drink; and causing the layer encasement to melt and become substantially clear.

6 Claims, 9 Drawing Sheets

STEP 10 - - - POUR AN ADDITIONAL AMOUNT (145) OF THE MIXED SECOND SOLUTION (134) ONTO THE COMBINATION (147), UNTIL A THIN LAYER (149) OF THE MIXED SECOND SOLUTION (134) COVERS THE EXPOSED PORTION (159) OF THE CLEAR ICE CUBE (119) TO FORM TOGETHER WITH THE FROZEN THIN LAYER (140) A THIN LAYER ENCASEMENT (151) COMPLETELY ENCASING THE CLEAR ICE CUBE (119), AND FORMING AN ENCASED COMBINATION (155) THEREWITH

STEP 11 - - - FREEZE THE ENCASED COMBINATION (155) TO FROM A FROZEN COMBINATION (153)

FIG. 3

METHOD OF MAKING NOVELTY ICE CUBES

BACKGROUND OF THE INVENTION

1. Field of the Invention

The present invention relates to an ice cube. More particularly, the present invention relates to a novelty ice cube.

2. Description of the Prior Art

Numerous innovations for ice have been provided in the prior art that will be described. Even though these innovations may be suitable for the specific individual purposes to which they address, however, they differ from the present invention.

FOR EXAMPLE, U.S. Pat. No. 4,021,583 to Arden teaches a fruit-flavored quiescently frozen confection which is high in total fruit solids content and which has increased resistance to melting and increased protection against stickiness in storage. The high concentration of fruit is obtained by using pureed fruit.

ANOTHER EXAMPLE, U.S. Pat. No. 5,077,075 to Wade teaches a fruit juice mix suitable for hard pack product made essentially from natural ingredients containing at least one fruit juice source in association with about 0.05 to 1.5 percent by weight of various stabilizers and preferably 0.30 to 0.60 percent xanthan gum based upon the total weight of the mix. An amount of water and other ingredients such that the blend has a brix value of greater than about 10 to about 35 and for more desirable results of 20 to 30 and preferably 20 to 25. No refined sugar or corn sweetener is added in or to the blend. Moreover, the juice mix can be frozen to form a hard pack material that can be stored at lower temperature, usually minus 18 degrees C. and lower for days and then be warmed to minus 5 to minus 10 degrees C. and be scooped out to be served and eaten without the appearance of being too icy, coarse, crumbly or gummy but exhibits a smooth, fine creamy texture and superior melt characteristics relative to soft pack.

STILL ANOTHER EXAMPLE, U.S. Pat. No. 5,394,705 to Torii et al. teaches a flavored ice manufacturing method for manufacturing flavored ice with a taste and smell possessing a uniform color or is colorless, which comprises a block ice manufacturing process; a crushing process for crushing this manufactured block ice into ice particles; and a sorting process for sorting these crushed ice particles into flavored ice of a predetermined particle diameter. In the sorting process, the ice particles are sorted into flavored ice of a predetermined particle diameter while spraying a dry-cooling fluid of 0 degrees C. or less onto the ice particles. As a result, a dry-cooling liquid is sprayed around the periphery of these ice particles, and thus the surface temperature of these ice particles can be maintained at a low temperature, and the water component existing around the periphery can be blown away. In this manner, adhesion of water and minute particles to the surface of the ice particles, as well as adhesion of neighboring ice particles is prevented. Consequently, the taste sensation of the flavored ice as well as the separation workability of the ice particles can be improved. In addition, the present invention provides flavored ice with an improved taste possessing a particle size within a predetermined range, which is difficult to melt, and in which there is no adhesion.

FINALLY, YET ANOTHER EXAMPLE, U.S. Pat. No. 5,603,219 to Kolb teaches an ice cell for the cooling of drinks that comprises a closed hollow body filled with a freezable liquid. The hollow body is made at least partially of a transparent material and has least one insert freely movable therein. The insert can have a printing thereon, be colored or marked in any desired manner, e.g., to identify the drink contained in the glass.

It is apparent that numerous innovations for ice have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a novelty ice cube that avoids the disadvantages of the prior art.

ANOTHER OBJECT of the present invention is to provide a novelty ice cube that is simple and inexpensive to manufacture.

STILL ANOTHER OBJECT of the present invention is to provide a novelty ice cube that is simple to use.

BRIEFLY STATED, YET ANOTHER OBJECT of the present invention is to provide a method of making novelty ice cubes that change color which includes the steps of: pouring water into a first ice cube tray to form a poured first solution; freezing the poured first solution to form a frozen first solution; removing the frozen first solution from the first ice cube tray to form clear ice cubes; adding a food dye to citric acid to form a second solution; mixing the second solution to form a mixed second solution; pouring a thin layer of the mixed second solution into a second ice cube tray to form a poured thin layer; freezing the poured thin layer to form a frozen thin layer; wetting the frozen thin layer to form a wetted thin layer; placing a clear ice cube of the clear ice cubes onto each wetted thin layer to form a combination; pouring an additional amount of the mixed second solution onto the combination, until a thin layer of the mixed second solution covers the exposed portion of the clear ice cubes to form together with the frozen thin layer a thin layer encasement that completely encases the clear ice cubes and forms with the clear ice cubes an encased combination; freezing the encased combination to from a frozen combination; removing the frozen combination from the second ice cube tray to form colored and flavored ice cubes; putting the colored and flavored ice cubes into a drink; and causing the thin layer encasement to melt and become substantially clear.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows.

LIST OF REFERENCE NUMERALS UTILIZED
IN THE DRAWING

First Embodiment 10 method of making of the novelty ice cube of the present invention
12 citric acid
14 water
16 first solution
18 pure citrus acid
20 natural juice from a citrus fruit 22
22 citrus fruit
24 orange
26 lemon
28 mixed first solution
30 food dye
32 second solution
34 mixed second solution
36 ice cube tray
38 poured second solution
40 frozen second solution
42 colored and flavored ice cubes
44 drink Second Embodiment 112 citric acid
114 water
116 poured first solution
117 frozen first solution
118 pure citric acid
119 clear ice cubes
120 natural juice from citrus fruit 122
122 citrus fruit
124 orange
126 lemon
130 food dye
132 second solution
134 mixed second solution
135 thin layer of mixed second solution 134
136 first ice cube tray
137 each compartment of first ice cube tray 136
138 poured thin layer
139 second ice cube tray
140 frozen thin layer
141 each compartment of second ice cube tray 139
142 colored and flavored ice cubes
143 wetted thin layer
144 drink
145 additional amount of mixed second solution 134
147 combination
149 thin layer of mixed second solution 134
151 thin layer encasement
153 frozen combination
155 encased combination
157 all sides of each wetted thin layer of wetted thin layer 143
159 exposed portion of clear ice cube 119

DETAILED DESCRIPTION OF THE
PREFERRED EMBODIMENT

Figure 1A:
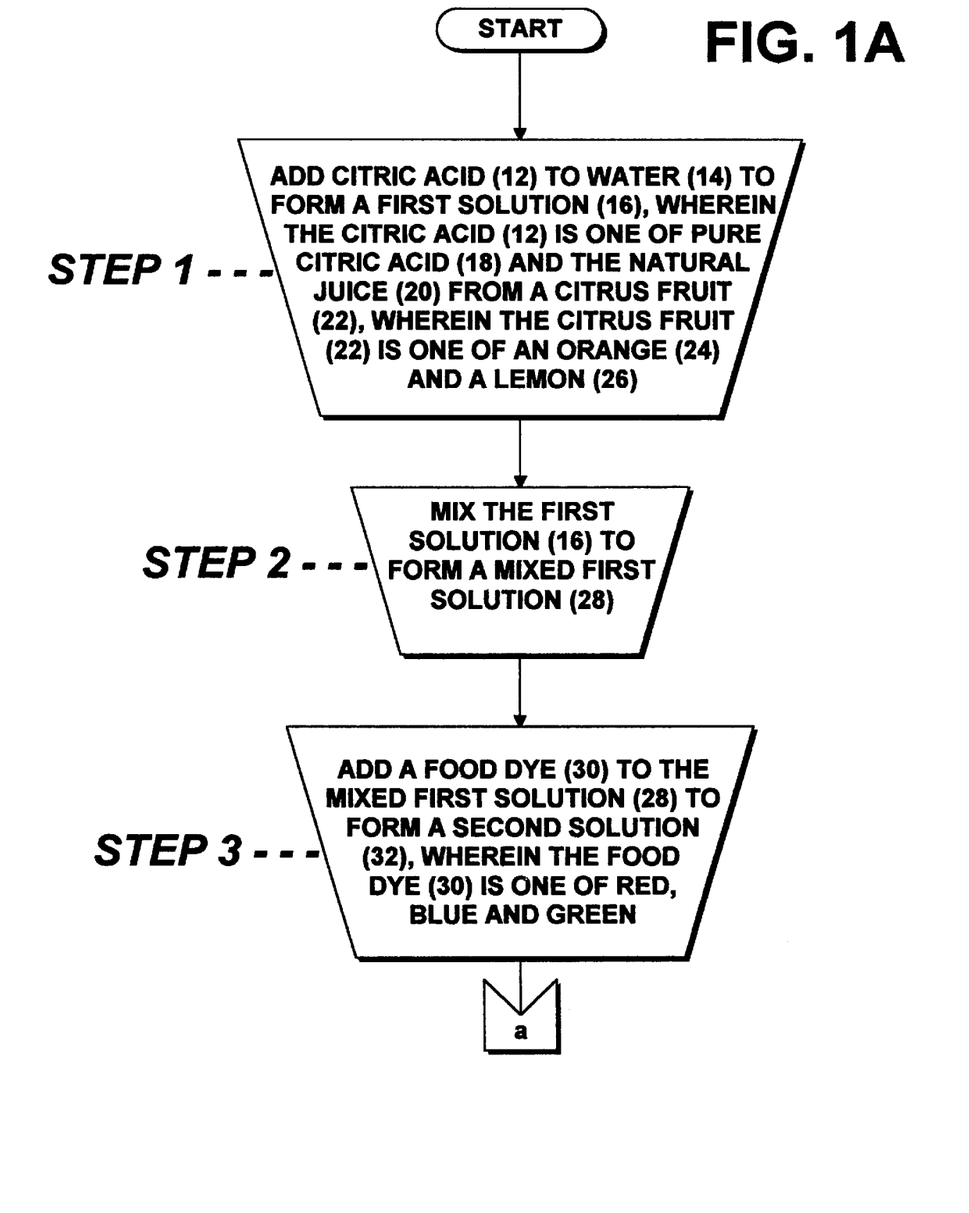
FIGS. 1A–1C are a process chart for making the first embodiment of the present invention.
Figure 1B:
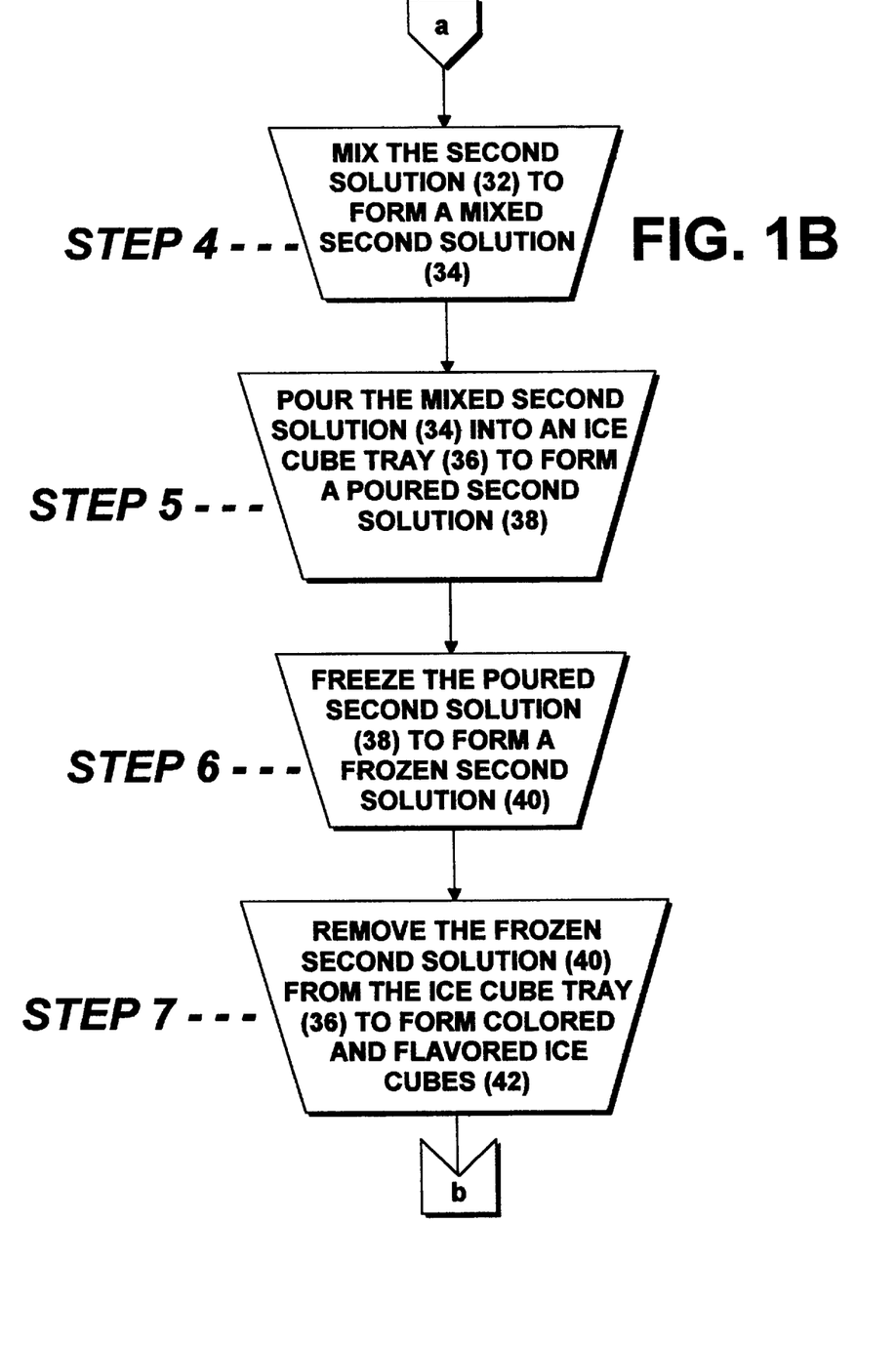
Figure 1C:
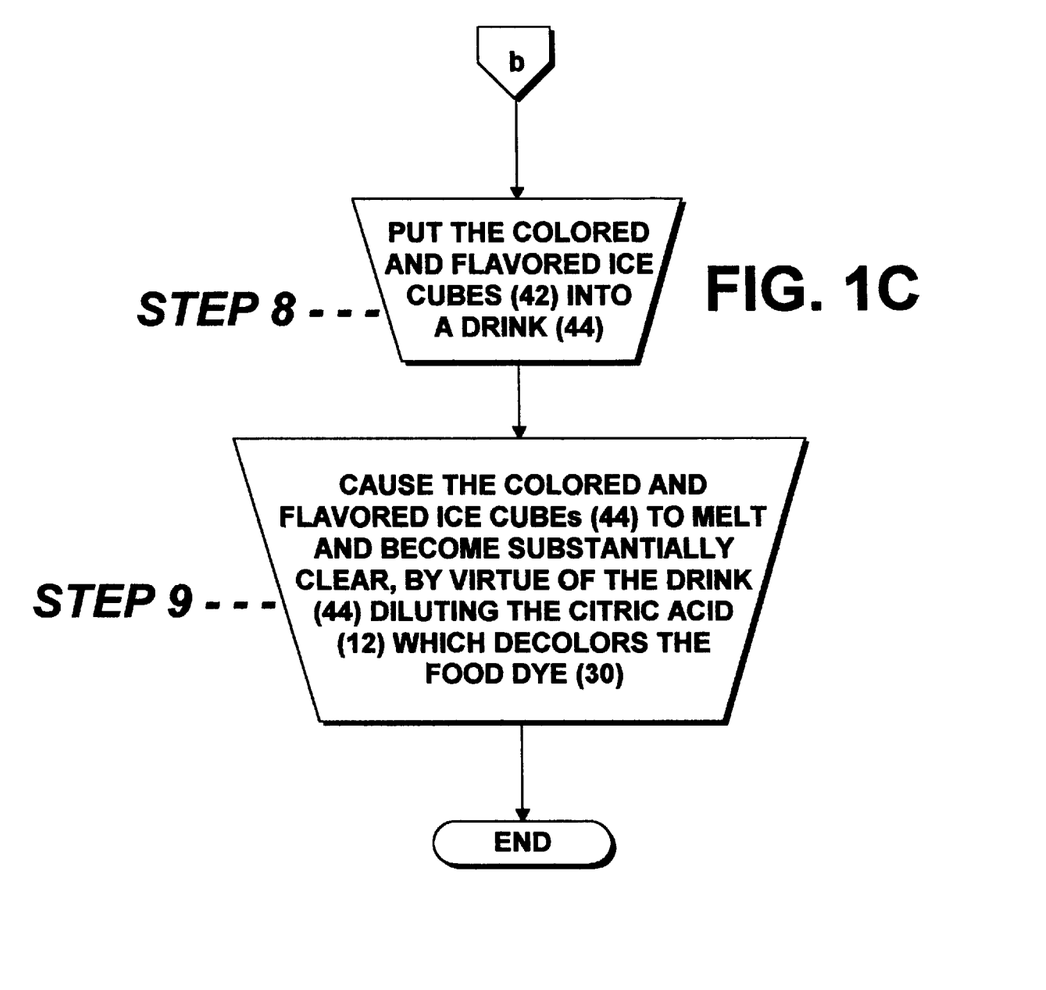

Referring now to the figures, in which like numerals indicate like parts, and particularly to FIG. 1, the method of making the first embodiment of the novelty ice cube of the present invention is shown generally at 10, and comprises the following steps:

STEP 1: Add citric acid ($H_3C_6H_5O_7H_2O$) 12 to water ($H_2O$) 14 to form a first solution 16, wherein the citric acid ($H_3C_6H_5O_7H_2O$) 12 is one of pure citrus acid 18 and the natural juice 20 from a citrus fruit 22, wherein the citrus fruit 22 is one of an orange 24 and a lemon 26.

STEP 2: Mix the first solution 16 to form a mixed first solution 28.

STEP 3: Add a food dye ($C_{20}H_6O_5I_4Na_2$) 30 to the mixed first solution 28 to form a second solution 32, wherein the food dye ($C_{20}H_6O_5I_4Na_2$) 30 is one of red, blue, and green.

STEP 4: Mix the second solution 32 to form a mixed second solution 34, wherein the mixed second solution 34 has the formula:

$$H_2O + H_3C_6H_5O_7H_2O + C_{20}H_6O_5I_4Na_2$$

wherein: $H_2O$ is water
$H_3C_6H_5O_7H_2O$ is lab grade citric acid
$C_{20}H_6O_5I_4Na_2$ is red #3 food dye STEP 5: Pour the mixed second solution 34 into an ice cube tray 36 to form a poured second solution 38.

STEP 6: Freeze the poured second solution 38 to form a frozen second solution 40.

STEP 7: Remove the frozen second solution 40 from the ice cube tray 36 to form colored and flavored ice cubes 42.

STEP 8: Put the colored and flavored ice cubes 42 into a drink 44.

STEP 9: Cause the colored and flavored ice cubes 42 to melt and become substantially clear, by virtue of the drink 44 diluting the citric acid ($H_3C_6H_5O_7H_2O$) 12 which substantially decolors the food dye ($C_{20}H_6O_5I_4Na_2$) 30.

EXAMPLE 1

5 ml of lab grade citric acid ($H_3C_6H_5O_7H_2O$) 12 was added to 5 ml of water ($H_2O$) 14 to form the first solution 16. The first solution 16 was mixed to form the mixed first solution 28. 0.5 ml of the red #3 food dye ($C_{20}H_6O_5I_4Na_2$) 30 was added to the mixed first solution 28 to form the second solution 32. The second solution 32 was mixed to form the mixed second solution 34. The mixed second solution 34 was poured into the ice cube tray 36 to form the poured second solution 38. The poured second solution 38 was frozen to form the frozen second solution 40. The frozen second solution 40 was removed from the ice cube tray 36 to form the colored and flavored ice cubes 42. The colored and flavored ice cubes 42 were put into the drink 44. The colored and flavored ice cubes 42 were caused to melt and became substantially clear.

Figure 2A:
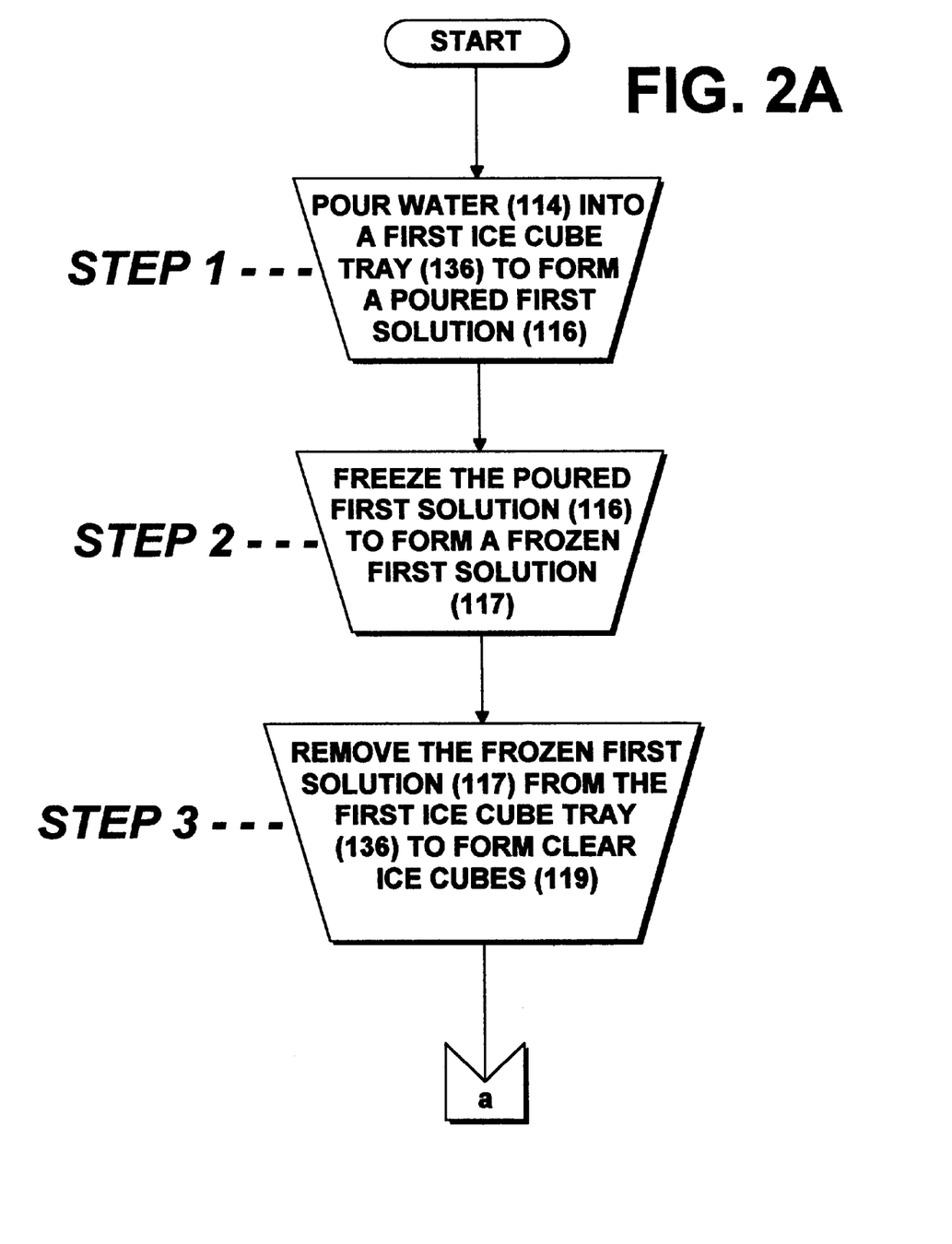
FIGS. 2A–2E are a process chart for making the second embodiment of the present invention.

The method of making the second embodiment of the novelty ice cube of the present invention 110 can best be seen in FIGS. 2A–2E, and as such will be discussed with reference thereto, and comprises the following steps:

STEP 1: Pour water ($H_2O$) 114 into a first ice cube tray 136 to form a poured first solution 116.

STEP 2: Freeze the poured first solution 116 to form a frozen first solution 117.

STEP 3: Remove the frozen first solution 117 from the first ice cube tray 136 to form clear ice cubes 119.

Figure 2B:
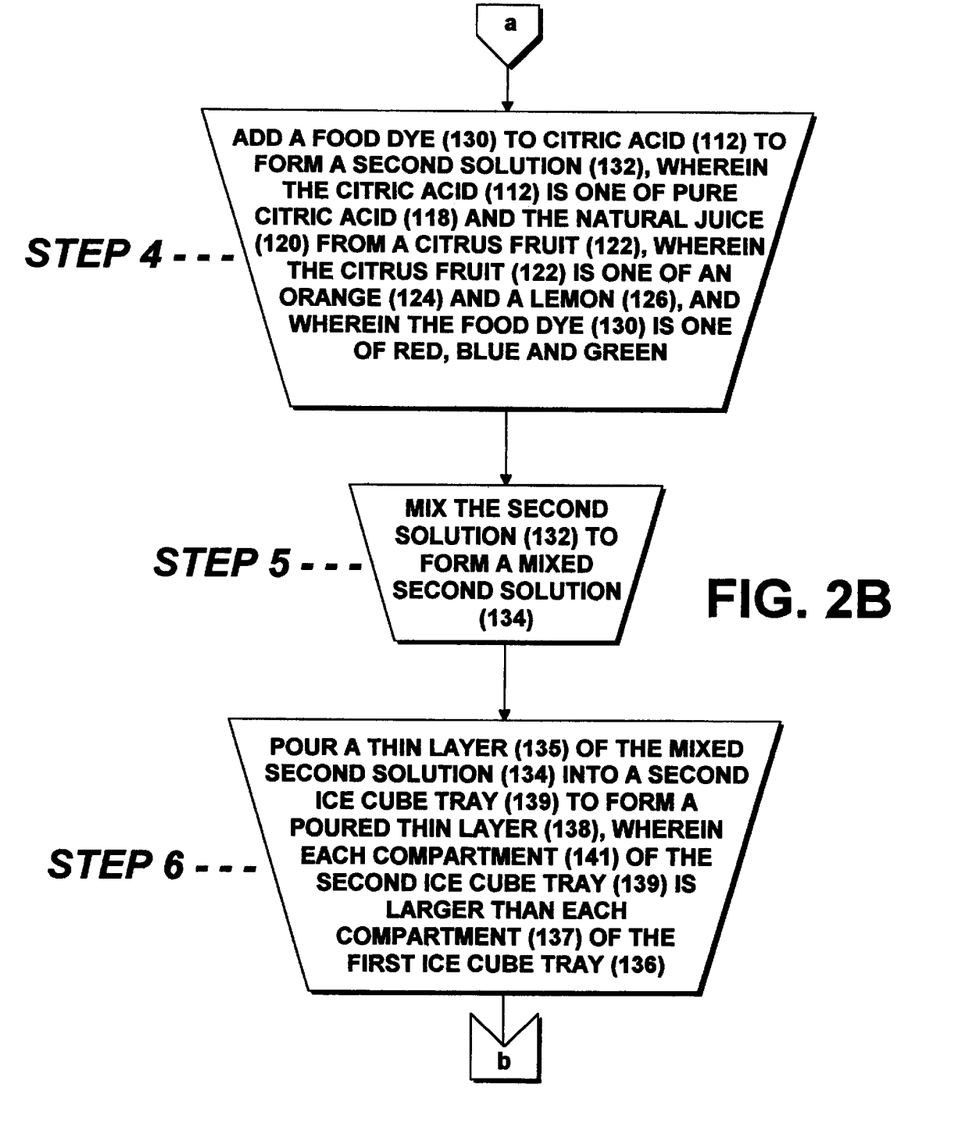

STEP 4: Add a food dye ($C_{20}H_6O_5I_4Na_2$) 130 to citric acid ($H_3C_6H_5O_7H_2O$) 112 to form a second solution 132, wherein the citric acid ($H_3C_6H_5O_7H_2O$) 112 is one of pure citric acid 118 and the natural juice 120 from a citrus fruit 122, wherein the citrus fruit 122 is one of an orange 124 and a lemon 126, and wherein the food dye 130 is one of red, blue, and green.

STEP 5: Mix the second solution 132 to form a mixed second solution 134, wherein the mixed second solution 134 has the formula:

$H_3C_6H_5O_7H_2O+C_{20}H_6O_5I_4Na_2$ wherein: $H_3C_6H_5O_7H_2O$ is lab grade citric acid
$C_{20}H_6O_5I_4Na_2$ is red #3 food dye STEP 6: Pour a thin layer 135 of the mixed second solution 134 into a second ice cube tray 139 to form a poured thin layer 138, wherein each compartment 141 of the second ice cube tray 139 is larger than each compartment 137 of the first ice cube tray 136.

Figure 2C:
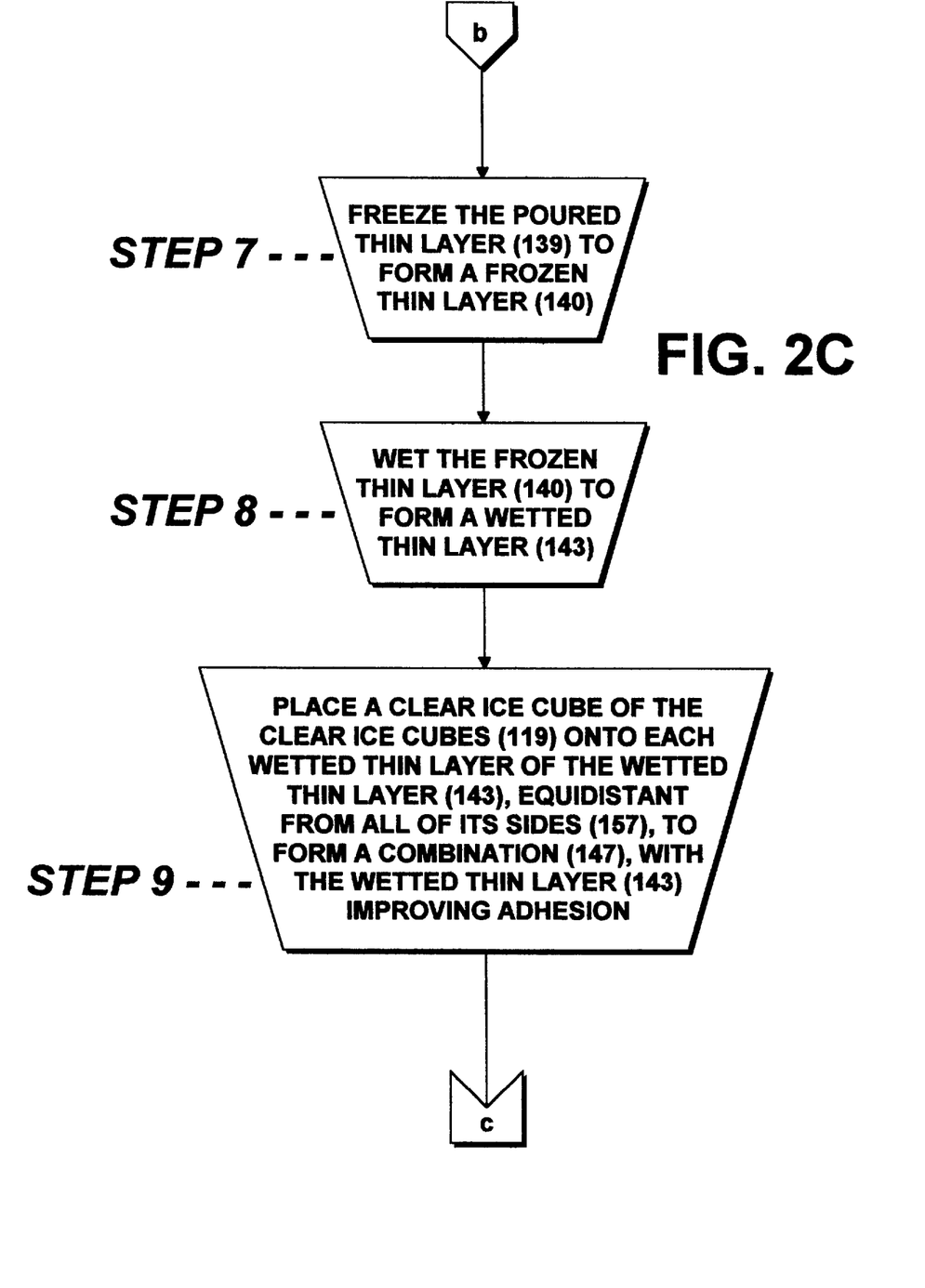

STEP 7: Freeze the poured thin layer 139 to form a frozen thin layer 140.

STEP 8: Wet the frozen thin layer 140 to form a wetted thin layer 143.

STEP 9: Place a clear ice cube of the clear ice cubes 119 onto each wetted thin layer 143, equidistant from all of its sides 157, to form a combination 147, with the wetted thin layer 143 improving adhesion.

Figure 2D:
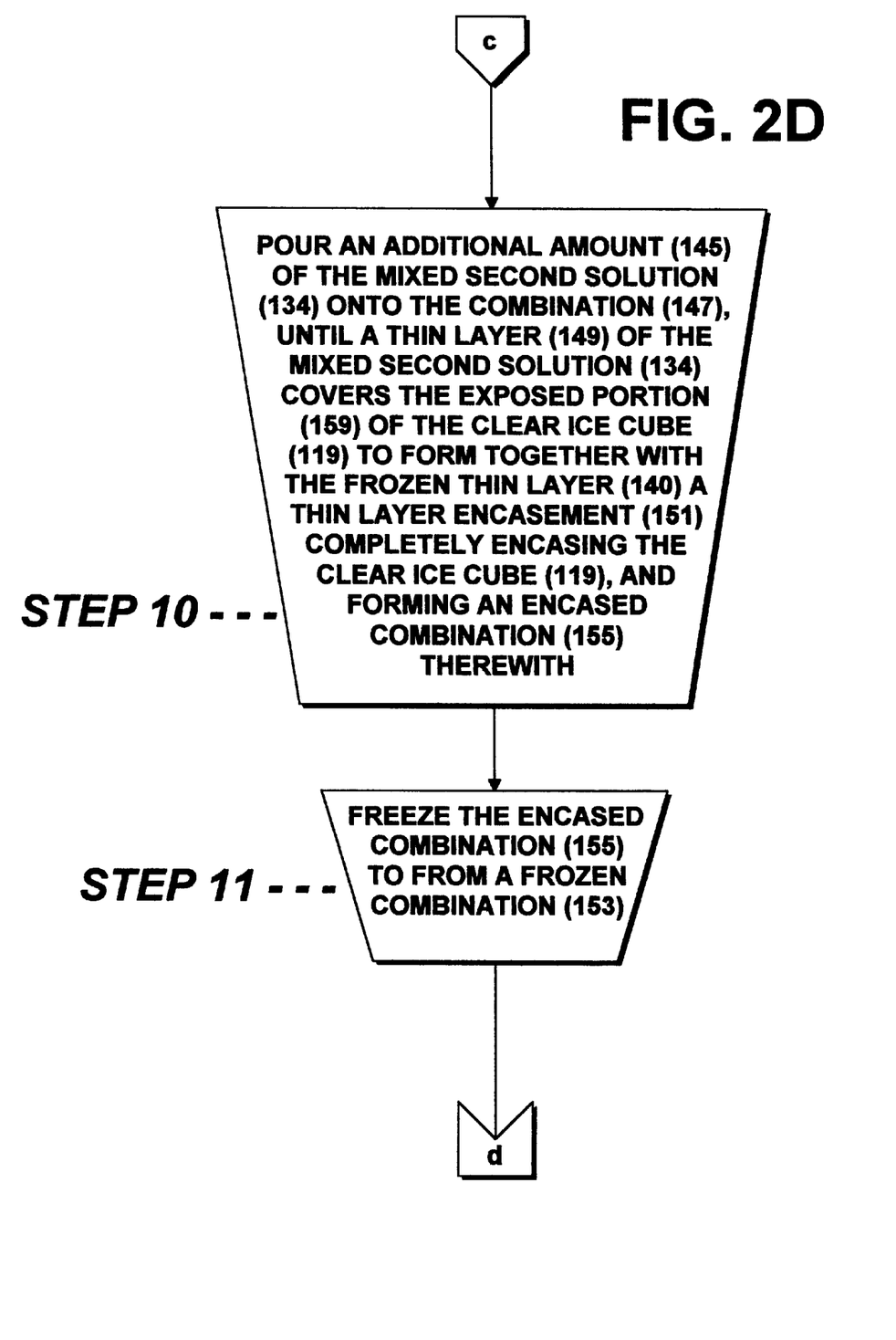

STEP 10: Pour an additional amount 145 of the mixed second solution 134 onto the combination 147, until a thin layer 149 of the mixed second solution 134 covers the exposed portion 159 of the clear ice cubes 119 to form together with the frozen thin layer 140 a thin layer encasement 151 that completely encases the clear ice cubes 119 and forms with clear ice cubes 119 an encased combination 155.

STEP 11: Freeze the encased combination 151 to from a frozen combination 153.

Figure 2E:
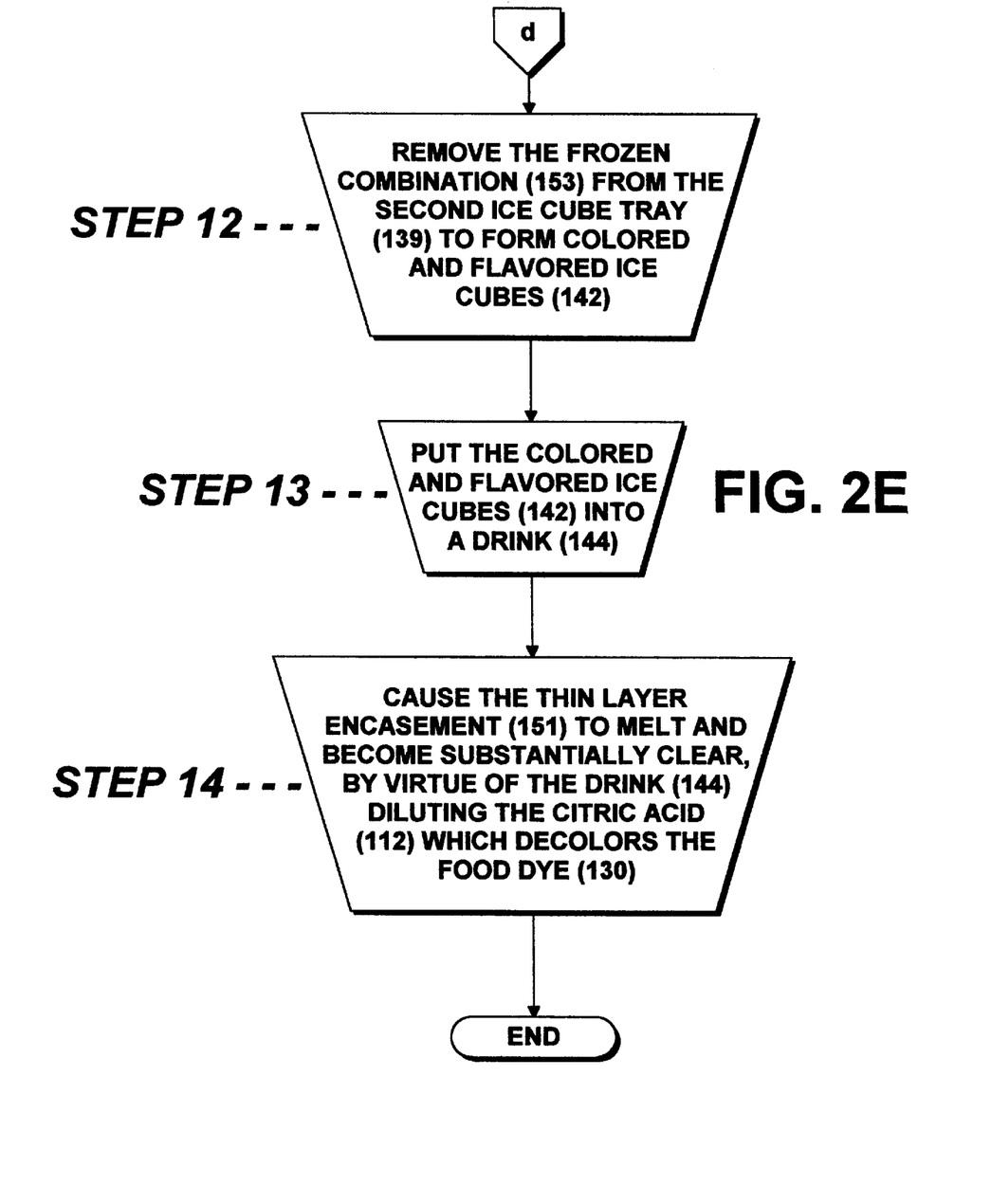
Figure 3:
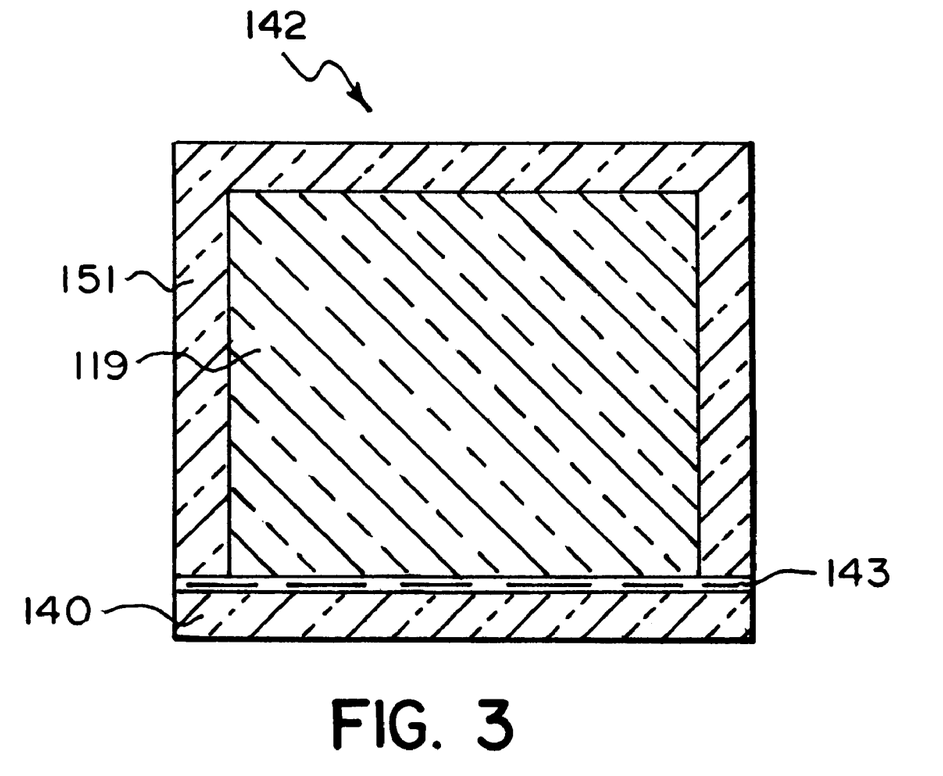
FIG. 3 is a cross sectional view of the colored and flavored ice cube produced by the second embodiment of the present invention.

STEP 12: Remove the frozen combination 153 from the second ice cube tray 139 to form colored and flavored ice cubes 142, as shown in FIG. 3.

STEP 13: Put the colored and flavored ice cubes 142 into a drink 144.

STEP 14: Cause the thin layer encasement 151 to melt and become substantially clear, by virtue of the drink 144 diluting the citric acid ($H_3C_6H_5O_7H_2O$) 112 which substantially decolors the food dye ($C_{20}H_6O_5I_4Na_2$) 130.

EXAMPLE 2

5 ml of water ($H_2O$) 114 was poured into the first ice cube tray 136 to form the poured first solution 116. The poured first solution 116 was frozen to form the frozen first solution 117. The frozen first solution 117 was removed from the first ice cube tray 136 to form the clear ice cubes 119. The food dye ($C_{20}H_6O_5I_4Na_2$) 130 was added to the citric acid ($H_3C_6H_5O_7H_2O$) 112 to form the second solution 132. The second solution 132 was mixed to form the mixed second solution 134. A thin layer 135 of the mixed second solution 134 was poured into the second ice cube tray 139 to form the poured thin layer 138. The poured thin layer 138 was frozen to form the frozen thin layer 140. The frozen thin layer 140 was wetted to form the wetted thin layer 143. A clear ice cube of the clear ice cubes 119 was placed onto each wetted thin layer 143 to form the combination 147. An additional amount 145 of the mixed second solution 134 was poured onto the combination 147, until the thin layer 149 of the mixed second solution 134 covered the exposed portion 159 of the clear ice cubes 119 and formed together with the frozen thin layer 140 the thin layer encasement 151 that completely encases the clear ice cubes 119, which forms with clear ice cubes 119 the encased combination 155. The encased combination 155 was frozen to from the frozen combination 153. The frozen combination 153 was removed from the second ice cube tray 139 to form the colored and flavored ice cubes 142. The colored and flavored ice cubes 142 were put into the drink 144. The thin layer encasement 151 was caused to melt and become substantially clear.

It will be understood that each of the elements described above, or two or more together, may also find a useful application in other types of constructions differing from the types described above.

While the invention has been illustrated and described as embodied in a novelty ice cube, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A method of making novelty ice cubes that change color, comprising the steps of:
    a) pouring water into a first ice cube tray to form a poured first solution;
    b) freezing said poured first solution to form a frozen first solution;
    c) removing said frozen first solution from said first ice cube tray to form clear ice cubes;
    d) adding a food dye to citric acid to form a second solution;
    e) mixing said second solution to form a mixed second solution;
    f) pouring an amount of said mixed second solution into a second ice cube tray to form a poured layer;
    g) freezing said poured layer to form a frozen layer;
    h) wetting said frozen layer to form a wetted layer;
    i) placing a clear ice cube of said clear ice cubes onto each wetted layer, equidistant from all of its sides, to form a combination, with said wetted layer improving adhesion;
    j) pouring an additional amount of said mixed second solution onto said combination, until a layer of said mixed second solution covers the exposed portion of said clear ice cubes to form together with said frozen layer a layer encasement that completely encases said clear ice cubes and which forms with said clear ice cubes an encased combination;
    k) freezing said encased combination to from a frozen combination; and
    l) removing said frozen combination from said second ice cube tray to form colored and flavored ice cubes.

2. The method as defined in claim 1, wherein said citric acid is one of pure citric acid and said natural juice from a citrus fruit.

3. The method as defined in claim 2, wherein said citrus fruit is selected from the group consisting of an orange and a lemon.

4. The method as defined in claim 1, wherein said food dye is selected from the group consisting of red, blue, and green.

5. The method as defined in claim 1, wherein each compartment of said second ice cube tray is larger than each compartment of said first ice cube tray.

6. The method as defined in claim 1, further comprising the steps of:
    m) putting said colored and flavored ice cubes into a drink; and
    n) causing said layer encasement to melt and become substantially clear.

* * * * *